(12) United States Patent
Bozzo et al.

(10) Patent No.: US 11,420,662 B2
(45) Date of Patent: Aug. 23, 2022

(54) DEVICE AND METHOD FOR THE SAFE MANAGEMENT OF VITAL COMMUNICATIONS IN THE RAILWAY ENVIRONMENT

(71) Applicant: HITACHI RAIL STS, Genoa (IT)

(72) Inventors: Paolo Bozzo, Genoa (IT); Jacopo D'Amico, Genoa (IT); Paola De Bernardi, Genoa (IT); Alessandro Parodi, Ceranesi (IT); Claudio Plescovich, Genoa (IT); Giorgio Ravera, Savona (IT)

(73) Assignee: Hitachi Rail STS S.P.A., Genoa (IT)

( * ) Notice: Subject to any disclaimer, the term of this patent is extended or adjusted under 35 U.S.C. 154(b) by 620 days.

(21) Appl. No.: 16/461,672

(22) PCT Filed: Nov. 15, 2017

(86) PCT No.: PCT/IB2017/057123
§ 371 (c)(1),
(2) Date: May 16, 2019

(87) PCT Pub. No.: WO2018/092028
PCT Pub. Date: May 24, 2018

(65) Prior Publication Data
US 2019/0351924 A1    Nov. 21, 2019

(30) Foreign Application Priority Data

Nov. 17, 2016    (IT) .......................... 102016000116085

(51) Int. Cl.
*B61L 27/40* (2022.01)
*B61L 15/00* (2006.01)
(Continued)

(52) U.S. Cl.
CPC .......... *B61L 27/40* (2022.01); *B61L 15/0027* (2013.01); *B61L 27/70* (2022.01); *H04L 63/0428* (2013.01)

(58) Field of Classification Search
CPC ...... B61L 27/40; B61L 27/70; B61L 15/0027; H04L 63/0428
(Continued)

(56) References Cited

U.S. PATENT DOCUMENTS 5,677,533 A * 10/1997 Yaktine .................... B61K 9/04
250/342
7,869,593 B2 * 1/2011 Beeson .................. H04L 9/3252
713/176
(Continued)

FOREIGN PATENT DOCUMENTS

DE    10 2007 041 177 A1    3/2009
EP         2039583 A1        3/2009

OTHER PUBLICATIONS

Fitzi, M., et al., "Pseudo-Signatures, Broadcast, and Multi-Party Computation from Correlated Randomness," CRYPTO, Chapter, Aug. 19, 2004, pp. 562-578.
(Continued)

*Primary Examiner* — Dant B Shaifer Harriman
(74) *Attorney, Agent, or Firm* — Workman Nydegger

(57) ABSTRACT

An apparatus and method for generating and verifying secure messages between vital equipment for controlling a railway network, wherein the apparatus includes control and/or processing components configured to carry out the following steps: a) generating a message body including information that may change the state of the railway network; b) generating a first pseudo-signature on the basis of the message body and a first cryptographic key; c) transmitting the first pseudo-signature to a second apparatus; d) receiving a second pseudo-signature from the second appa-
(Continued)

ratus; e) generating a message signature on the basis of the second pseudo-signature and the first cryptographic key; f) generating a message by combining the message body and the message signature; g) sending the message to a recipient.

11 Claims, 3 Drawing Sheets

(51) Int. Cl.
  *H04L 9/40* (2022.01)
  *B61L 27/70* (2022.01)
(58) Field of Classification Search
  USPC ......................................................... 713/168
  See application file for complete search history.

(56) References Cited

U.S. PATENT DOCUMENTS

| | | | | |
|---|---|---|---|---|
| 7,936,869 | B2* | 5/2011 | Beeson | G06Q 20/3674 |
| | | | | 380/282 |
| 8,291,231 | B2* | 10/2012 | Ueno | H04L 9/3263 |
| | | | | 713/168 |
| 8,352,380 | B2* | 1/2013 | Canard | H04L 9/3255 |
| | | | | 713/180 |
| 8,510,563 | B2* | 8/2013 | Seki | H04L 63/0823 |
| | | | | 713/168 |
| 8,914,640 | B2* | 12/2014 | Haddad | H04L 9/3247 |
| | | | | 713/176 |
| 2006/0153368 | A1* | 7/2006 | Beeson | H04L 9/3252 |
| | | | | 380/30 |
| 2014/0074327 | A1* | 3/2014 | Weber | B61L 15/0027 |
| | | | | 701/19 |
| 2016/0355199 | A1* | 12/2016 | Kernwein | B61L 11/08 |
| 2019/0351924 | A1* | 11/2019 | Bozzo | B61L 27/70 |
| 2020/0195426 | A1* | 6/2020 | Dreasher | H04L 9/0838 |

OTHER PUBLICATIONS

Tompkins, T., et al., "Giving e-mail back to the users: Using digital signatures to solve the spam problem," First Monday (Online), vol. 8, No. 9, Sep. 1, 2003, pp. 1-11.
International Search Report and Written Opinion dated Mar. 2, 2018, issued in PCT Application No. PCT/IB2017/057123, filed Nov. 15, 2017.

* cited by examiner

DEVICE AND METHOD FOR THE SAFE MANAGEMENT OF VITAL COMMUNICATIONS IN THE RAILWAY ENVIRONMENT

BACKGROUND OF THE INVENTION

1. The Field of the Invention

The present invention relates to an apparatus and method for generating and exchanging messages on communication lines for the control of a railway network, in particular of secure messages, i.e., messages fulfilling the integrity requirements typical of the railway sector.

2. The Relevant Technology

As is well-known, the development of rail networks over the last few decades has led to an increase in the level of automation, especially with regard to the control and supervision of the railway networks and traffic circulating on them. This increase in the level of automation has also resulted in an increase in the communication bandwidth required for operating the monitoring and control equipments.

As established by CENELEC EN 50159 and later, these devices must work with a Safety Integrity Level (SIL) level of four. One of the ways to ensure that these requirements are met is to use safe processing systems (Safe Calculator), which have the task of collecting, processing and communicating vital information and/or commands (i.e., necessary for the safe operation of the railway line controlled by them) in the form of communication protected by time-varying digital signature. These devices are designed using redundant architectures (2oo2), i.e., using a pair of apparatuses (each of which is also known as 'replica'), wherein each of them must process the information and jointly authorize the sending of a valid vital message. In this context, it is necessary to ensure the security of such communications, i.e., to design the system, so that in case of disagreement between at least two replicas it is not possible to send a valid and potentially dangerous vital message. This task is performed by a third device, namely an intrinsically safe circuitry called "Watchdog", which has the task of allowing or interrupting outbound communications safely. Therefore, this device makes possible to switching off both devices when a discordance between at least two replicas is detected; indeed, such discordance is typically a symptom of a malfunction. In the field of rail, switching off these systems allows to bring the controlled transport system (such as railway convoys, exchanges, signals or the like) to a safe state that is typically defined at design stage, such as a state in which the power is not supplied to the railway line, the trains are stationary, and all exchanges are positioned so that any circulating convoys can not collide with each other.

However, the presence of this circuitry increases the duration of the validation phase of the whole system, since the system consists of a greater number of components that make it more complex.

This problem is solved in US patent application US 2014/074327 A1 on behalf of SIEMENS INDUSTRY INC., wherein a control system comprising a pair of replicas (said controllers) is described, wherein only one of the two replicas is configured to generate the information for verification of integrity and authenticity (output security code). This produces a marked functional difference between the two replicas that increases the intervention time in case an action just taken by both replicas has to be nullified, e.g., because one of them has detected a malfunction or because one of them has detected (before the other) an abnormal situation (such as the presence of a car on the rails, two convoys on the same line that travel in opposite directions, or the like).

SUMMARY OF THE INVENTION

The present invention aims to solve these and other problems by providing an apparatus and method for generating messages for controlling a railway network according to the invention.

The underlying idea of the present invention is to generate a signature for checking the authenticity and integrity of a message body by using at least two independent contributions, i.e., configuring a first and a second apparatus according to the invention to generate respectively a first and a second pseudo-signature using distinct cryptographic keys for each apparatus, exchanging said pseudo-signatures, and generating a signature using its own key and the received pseudo-signature, wherein said first and second apparatus are configured as two independent replicas each of which is configured to perform a set of control logic for controlling a portion of the rail network independently of the other apparatus, so as to ensure the necessary redundancy.

In this way, it is possible to reduce the intervention time in the event of one of the two apparatuses detects either an anomalous operation of the other apparatus or an abnormal situation, since each of the apparatuses according to the invention can invalidate the current message by stopping the generation of the pseudo-signature or by altering the pseudo-signature or the signature in preparation or already prepared, for example by providing a random bit sequence or by not providing the signature within a predetermined deadline.

In fact, the control messages of a railway network, i.e., messages that alter the status of said network, must contain a control code and a signature that allow each control/supervisory apparatus to verify the integrity and authenticity of the network message. By exploiting this requirement, the invention allows to invalidate a control message over a longer period of time than the solutions according to the state-of-the-art.

Further advantageous features of the present invention are set forth in the appended claims.

BRIEF DESCRIPTION OF THE DRAWINGS

These features and further advantages of the present invention will become more apparent from the description of one embodiment thereof shown in the accompanying drawings, provided purely by way of non-limiting example, wherein.

DETAILED DESCRIPTION OF THE PREFERRED EMBODIMENTS

In this description, any reference to "an embodiment" will indicate that a particular configuration, structure or feature described in regard to the implementation of the invention is comprised in at least one embodiment. Therefore, the phrase "in an embodiment" and other similar phrases, which may be present in different parts of this description, will not necessarily be all related to the same embodiment. Furthermore, any particular configuration, structure or feature may be combined in one or more embodiments in any way deemed appropriate. The references below are therefore used only for simplicity's sake, and do not limit the protection scope or extension of the various embodiments.

Figure 1:
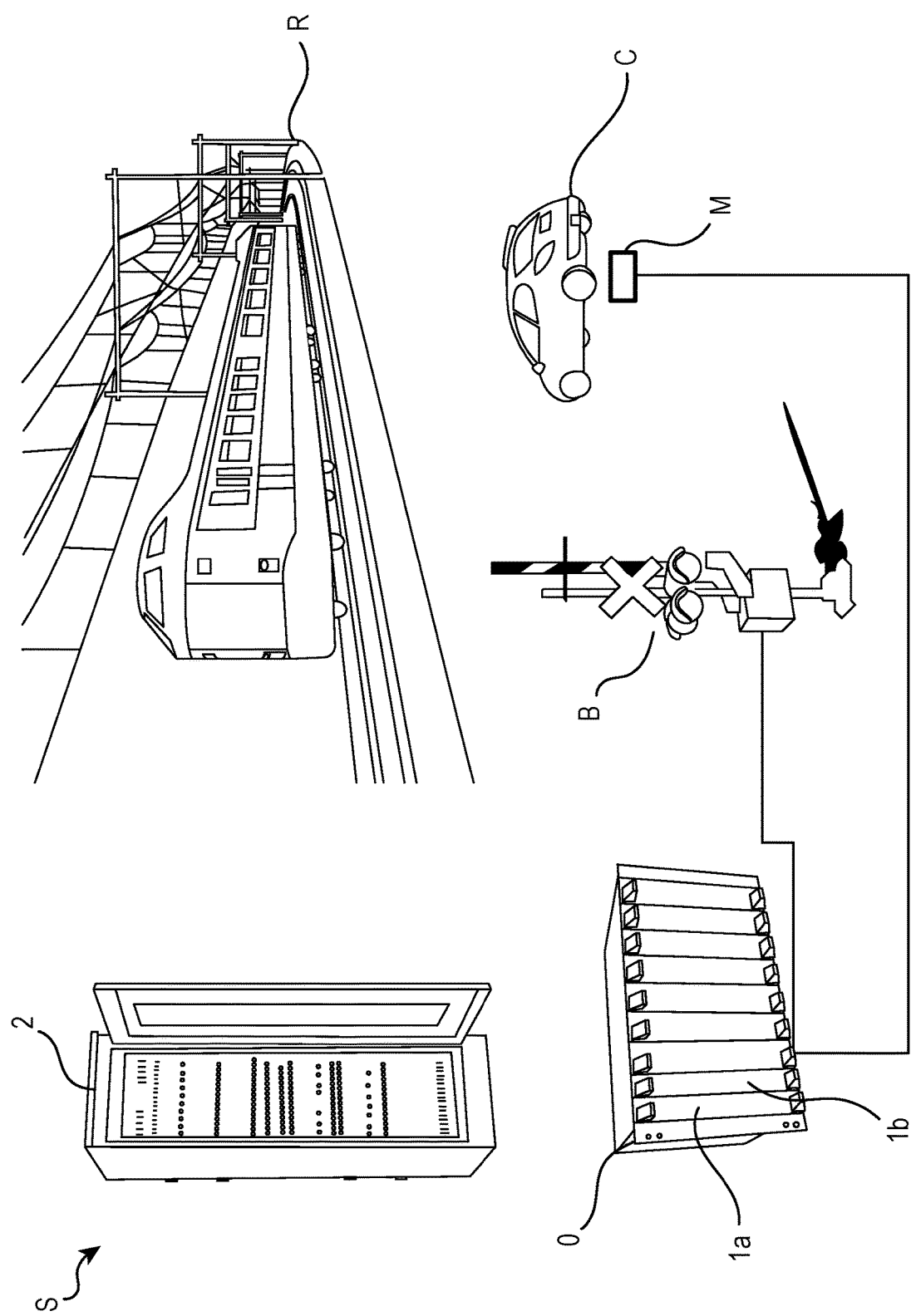
FIG. 1 illustrates a rail system comprising two apparatus according to the invention.

Referring to FIG. 1, a rail system S will now be described; such rail system S preferably comprises the following parts:
- a railway line R on which least one railway convoy can transit;
- a level crossing signal B comprising a mobile barrier;
- a sensor M, such as an induction sensor, a magnetic sensor or the like, able to detect the presence of a car C and/or another vehicle that is crossing the level crossing;
- a system 0 for generating message for controlling a railway network, comprising
  - a first apparatus 1a according to the invention preferably in signal communication with the signal B and the sensor M;
  - a second apparatus 1b according to the invention preferably in signal communication with the signal B and the sensor M;
- an electronic monitoring and control computer 2, which is in signal communication with the apparatuses 1a, 1b, and capable to provide information about the state of said apparatuses 1a, 1b, the signal B, and the sensor M to an operator, and possibly capable to change said state (e.g., lowering/raising bar B independently of the presence of a train in transit on line R, or the like).

It should be noted that the following description will be referred to the level crossing for exemplifying purpose only, because the object of the invention may be applied to other parts of a railway system that need to generate messages for the control of the railway network (such as railway cars, railroad switches, supervisory systems, or the like).

Figure 2:
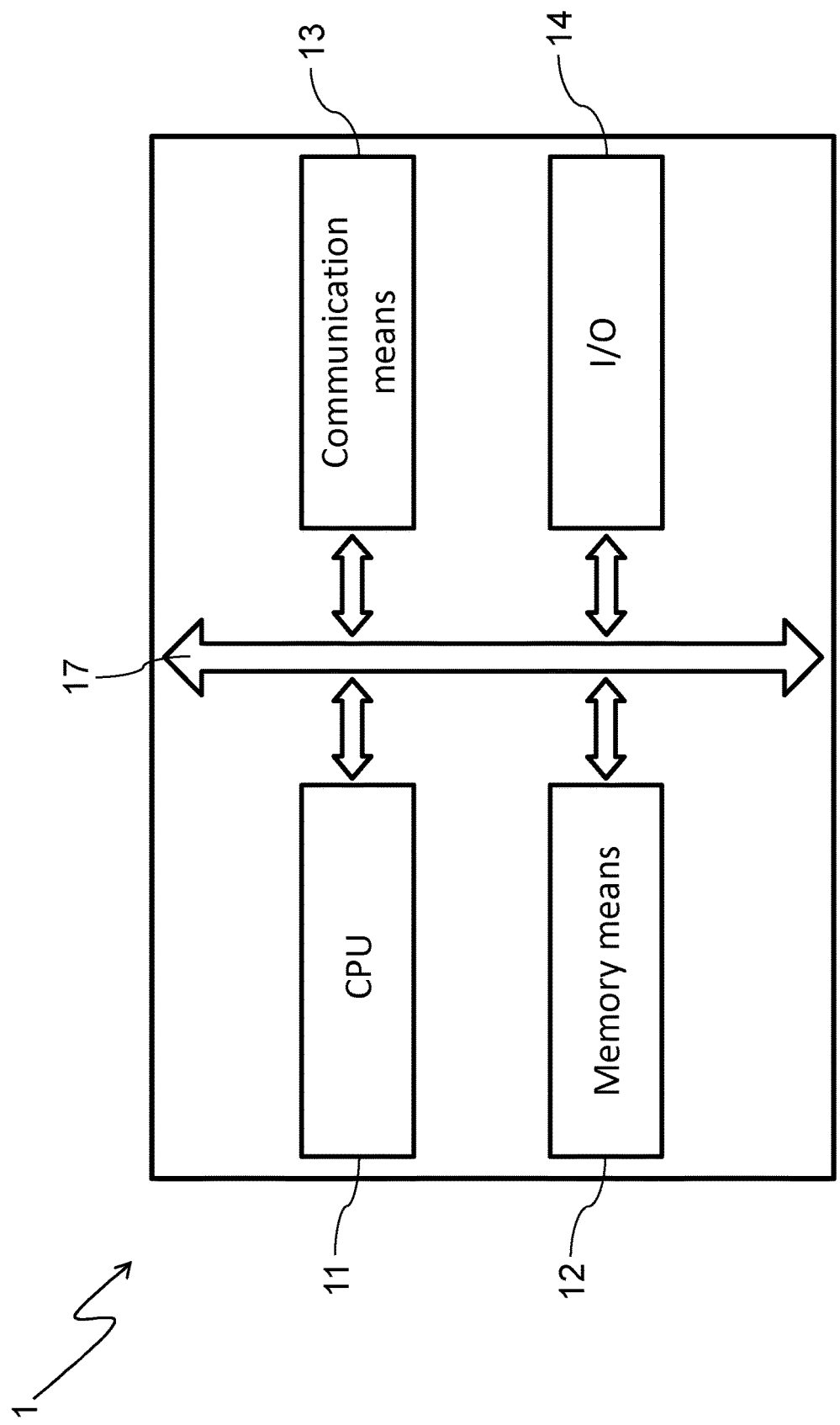
FIG. 2 illustrates an architecture of the apparatus of FIG. 1.

With also reference to FIG. 2, the following description will now describe the apparatus 1 (referred in FIG. 1 with symbols 1a and 1b); such apparatus 1 comprises the following components:
- control and/or processing means 11 (for brevity also referred to as CPUs), such as one or more CPUs and/or microcontrollers and/or FPGAs and/or CPLDs and/or the like, which are capable to generate messages for controlling the railway network, preferably in a programmable manner, by executing specific instructions;
- memory means 12, such as a RAM random access memory and/or a Flash memory and/or another type memory, which are in signal communication with control and/or processing means 11, and wherein said volatile memory means 12 preferably contain at least the instructions implementing the method according to the invention, wherein said instructions can be read by the control and/or processing means 11 when the apparatus 1 is in an operating condition; moreover, such memory means 12 contain at least one first cryptographic key (which will be better described in the following description, and will be referred to with terms 'key' or 'first key') and may also contain a set of instructions implementing control logic that allows said apparatus 1 to control a portion of the rail network;
- communication means 13, preferably an interface operating according to one of the communication standards allowed by the ERTMS/ETCS system or one of the standards of the IEEE 802.3 family (known as Ethernet), IEEE 802.11 (known as WiFi) or IEEE 802.16 (known as WiMax), or an interface to a GSM-R or GSM/GPRS/UMTS/LTE or TETRA data network that allows the device 1 to communicate with other equipment 1b and/or with other elements such as the rail signal B, the electronic monitoring and control computer 2, or other equipment present in the rail system S;
- input/output means (I/O) 14, which can for example be used to connect (directly) said apparatus 1 to the signal B and/or to the sensor M and/or to connect said apparatus 1 to a programming terminal configured for writing instructions (which the processing and control means 11 will have to perform later) in the memory means 12 and/or to diagnose any failure of said apparatus 1; such input/output means 14 can for example include a USB, Firewire, RS232, IEEE 1284, Ethernet, WiFi, Bluetooth and/or a relay board capable of controlling the movement of the signal barrier B based on a value written in a memory by the control and/or processing means 11, or the like;
- a communication bus 17 which enables the exchange of information between the control and/or processing means 11, the memory means 12, the communication means 13, and the input/output means 14.

As an alternative to the communication bus 17, a star architecture can be used for connecting the control and/or processing means 11, the memory means 12, the communication means 13, and the input/output means 14.

Figure 3:
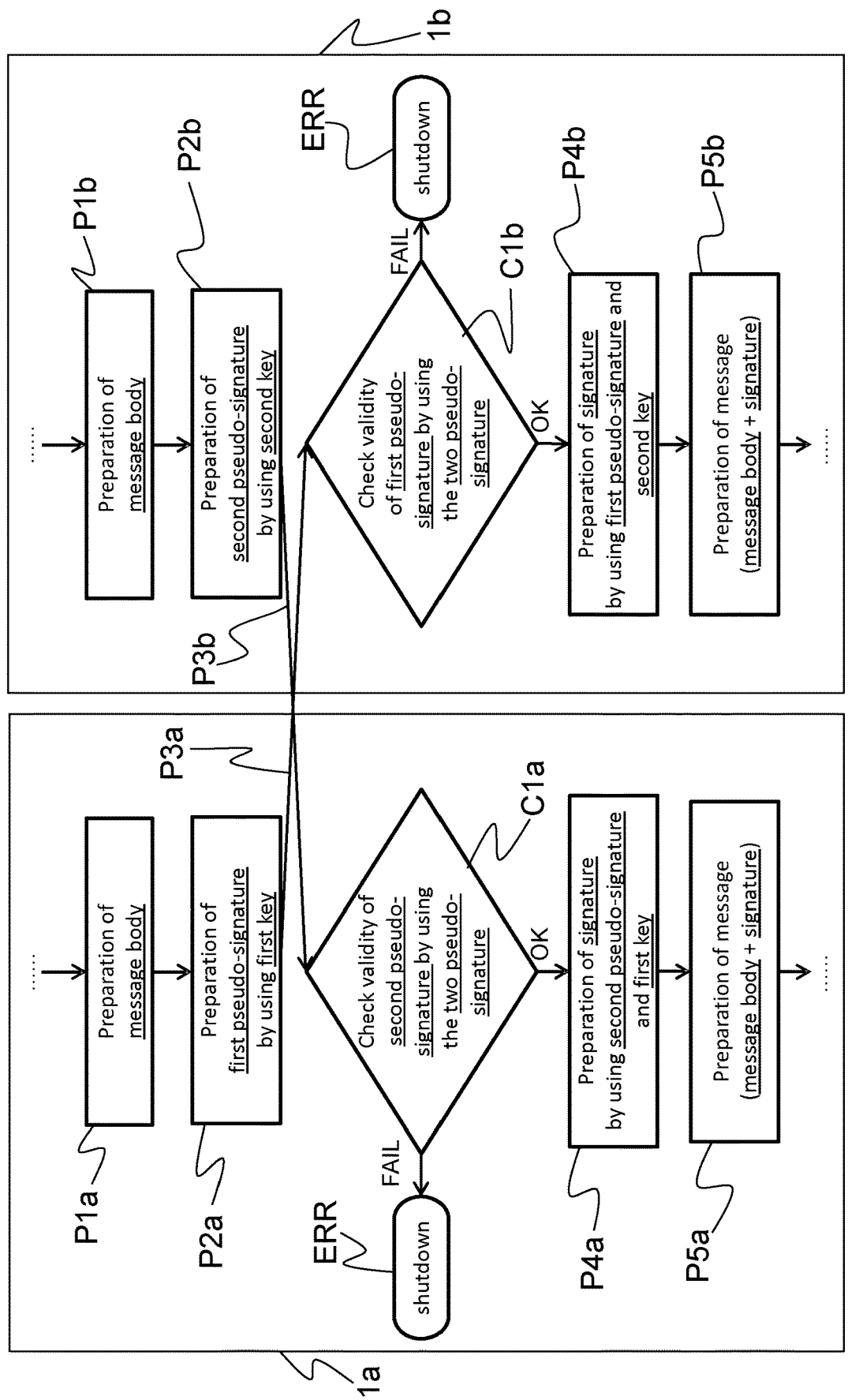
FIG. 3 illustrates a block diagram describing the operation of the apparatus of FIG. 1 when executing a set of instructions implementing a method according to the invention.

Referring also to FIG. 3, a method for generating messages for controlling a railway network according to the invention will now be described, wherein said method is implemented by a set of instructions that can be performed by each of the apparatuses 1a and 1b.

When each of the apparatuses 1a and 1b is in an operating condition, the control and/or processing means 11 perform a set of instructions implementing the method according to the invention. This method comprise at least the following steps:

a. a message body preparation phase P1a, P1b, wherein the CPU 11 generates a message body, which is preferably determined on the basis of the control logics stored in the memory means 12 and any inputs such as a sensor signal generated by the sensor M and/or a message generated by the processor 2 and received by means of communication means 13 or the like;

b. a signature contribution preparation phase P2a,P2b, wherein the CPU 11 generates a first pseudo-signature on the basis of the message body and the first key (which will be described more precisely in the following description);

c. a signature contributions exchanging phase P3a,P3b, wherein the CPU 11 transmits, by means of the communication means 13, said pseudo-signature to the other apparatus according to the invention, and receives, always by means of the communication means 13, a second pseudo-signature generated by said other apparatus on the basis of another message body (generated in a manner similar to the one just described above) and a second key different from the first key;

d. a signature preparation phase P4a,P4b, wherein the CPU 11 generates a signature (referred to also as 'message signature') on the basis of the first key and the second pseudo-signature received by the other apparatus;

e. a message preparation phase P5a,P5b, wherein the CPU 11 generates a message, which can control at least part of the railway network, by combining the message body and the signature, e.g., by concatenating them;

f. a transmission phase (not shown in the accompanying figures), wherein the CPU 11 transmits, by means of the communication means 13, the message to a recipient.

It should be noted that apparatus 1 can be configured to execute the phases in a non-sequential manner, i.e., the phases b., c., d. can begin when the phases a., b., c. are not yet terminated.

It is highlighted that the message body preparation phase is performed according to the state of the art; hence, the data that is included in the message body may already be the result of a voting activity involving both the apparatuses 1*a*, 1*b*.

During the signature contribution preparation phase P2*a*, P2*b*, the CPU 11 is preferably configured to execute a set of instructions implementing a hashing algorithm (such as the MD4, MD5 or other algorithm) and to generate the pseudo-signature using a key. In the following description, string Key_A identifies the first key used by the first apparatus 1*a*, and string Key_B identifies the second key used by the second apparatus 1*b*. More in details, the two pseudo-signatures (identified by strings pseudo-signature_A and pseudo-signature_B) are preferably generated as follows:

$$\text{pseudo-signature\_A} = \text{hash(message body)} \oplus \text{Key\_A}$$

$$\text{pseudo-signature\_B} = \text{hash(message body)} \oplus \text{Key\_B}$$

wherein the symbol $\oplus$ indicates the operation of bitwise exclusive OR (bitwise-XOR); therefore, the length of the string produced by the hashing algorithm and the lengths of the keys Key_A and Key_B should preferably be the same.

As mentioned before, the two keys are distinct. This does not affect the proper functioning of the first apparatus 1*a*, which only knows the first Key_A key, and the second apparatus, which only knows the second Key_B key, since the XOR operator enjoys commutative property, i.e., $$\text{Key\_A} \oplus \text{Key\_B} = \text{Key\_B} \oplus \text{Key\_A}$$

Indeed, during the signature preparation phase P4*a*, P4*b*, the apparatuses 1*a*, 1*b* are preferably configured to perform the following operations respectively:

$$\text{pseudo-signature\_B} \oplus \text{Key\_A}$$

$$\text{pseudo-signature\_A} \oplus \text{Key\_B}$$

Expanding the logical expressions shown above, it is possible to write the following relations:

$$\text{pseudo-signature\_B} \oplus \text{Key\_A} = \text{hash(message body)} \oplus \text{Key\_B} \oplus \text{Key\_A}$$

$$\text{pseudo-signature\_A} \oplus \text{Key\_B} = \text{hash(message body)} \oplus \text{Key\_A} \oplus \text{Key\_B}$$

where defining Key_AB as $$\text{Key\_AB} := \text{Key\_A} \oplus \text{Key\_B} = \text{Key\_B} \oplus \text{Key\_A}$$

it is possible to write the following relations:

$$\text{pseudo-signature\_A} \oplus \text{Key\_B} = \text{hash(message body)} \oplus \text{Key\_AB}$$

$$\text{pseudo-signature\_B} \oplus \text{Key\_A} = \text{hash(message body)} \oplus \text{Key\_AB}$$

From here it is possible to understand how each of the two apparatus 1*a*, 1*b* can compute a signature without knowing both keys since it is possible to define the signature as $$\text{signature} = \text{pseudo-signature\_A} \oplus \text{Key\_B}$$

$$= \text{pseudo-signature\_B} \oplus \text{Key\_A}$$

This technique therefore allows to synchronize signature generation, avoiding that only one apparatus performs the entire task, so that each of the two apparatuses can intervene for a longer period of time than the solution according to state of the art, by avoiding the shutdown of both apparatuses 1*a* and 1*b* in the event of an abnormal situation.

It is highlighted that Key_AB (which will also be referred to as 'verification key') is the key to verify the authenticity and integrity of the messages issued by both devices 1*a* and 1*b*, i.e., by the system 0.

Key_A and Key_B are preferably generated by a pseudo-random cryptographic generator, while Key_AB is generated by executing an bitwise exclusive OR operation between the two Key_A and Key_B keys. This does not implicate security issues, as knowing only Key_AB it is not possible getting both Key_A and Key_B.

Taking advantage of this signature generation technique, the method according to the invention may also comprise a signature contribution verification phase C1*a*,C1*b*, which is performed downstream of the phase P2*a*,P2*b* and upstream of the phase P4*a*,P4*b*, during which it is possible determine whether the signature received from the other device is valid.

This is possible by using the two pseudo-signatures (i.e., the generated one and the received one) and knowing Key_AB (which will also referred to as 'verification key'). More in details, CPU 11 can be configured to execute a further set of instructions that allow to perform the following Boolean operation:

$$\text{pseudo-signature\_A} \oplus \text{pseudo-signature\_B} == \text{Key\_AB}$$

where with the == symbol identifies the comparison operator that returns a true value if the two bit strings are equal, otherwise it returns a false value.

Expanding the left side of the above relation, it is possible to write the following new relation:

$$\text{pseudo-signature\_A} \oplus \text{pseudo-signature\_B} =$$

$$\text{hash(message body)} \oplus \text{Key\_A} \oplus \text{hash(message body)} \oplus \text{Key\_B}$$

In view of the XOR operator's truth table, you can simplify the relationship as follows:

$$\text{pseudo-signature\_A} \oplus \text{pseudo-signature\_B} =$$

$$\oplus \text{Key\_A} \oplus \oplus \text{Key\_B}$$

and it is therefore possible to write $$\text{pseudo-signature\_A} \oplus \text{pseudo-signature\_B} = \text{Key\_A} \oplus \text{Key\_B} = \text{Key\_AB}$$

From here it is possible to understand how the result of the bitwise exclusive OR of the two pseudo-signatures can be exploited to verify the validity of the pseudo-signature received by the other apparatus according to the invention.

If the comparison between the result of the XOR of the two pseudo-signatures and Key_AB gives a positive result (both signatures are the same), the apparatus performs the phase P4*a*,P4*b*, otherwise the apparatus enters in an error state ERR, in which said apparatus performs the security measures for which it has been programmed, such as stopping its operation or signaling the problem to the electronic monitoring and control computer 2, and stop the preparation of messages that may change the status of the railway network, or the like.

The presence of this further signature contribution verification phase C1*a*,C1*b* advantageously enables devices 1*a*,1*b* to detect, earlier than the solution described above, if anomalous situation is occurring in the other apparatus due to a failure or to a dangerous situation detected only by the other apparatus.

Each of the apparatuses 1a,1b can be configured to perform a further voting phase after the message preparation phase P5a,P5b, wherein during said voting phase said apparatuses 1a,1b performs the following steps:

send the message (signed) to the other apparatus;
receive the message (signed) from the other apparatus;
compare the local (signed) generated message with the one received from the other device and, if the comparison is successful (equal messages), proceed to the transmission, or otherwise enter in an error state like the one described above.

It should be noted that it is also possible to avoid this voting phase, namely each apparatus 1a,1b can transmit the messages as they are generated. In fact, the recipient would still be able to evaluate the validity of the message, since the devices controlling a railway network must necessarily carry out this check.

In case one of the two apparatuses 1a,1b detects a malfunction and/or the occurrence of an abnormal condition (e.g., detects, by means of the sensor M, the presence of a car on the railway tracks while the signal barrier B is lowering), the control and/or processing means 11 are configured to alter the first pseudo-signature or signature to invalidate said message. In this way, it is ensured that the problem is timely reported during the signature contribution verification phase C1a,C1b and/or during the (optional) voting phase described above, since during these phases it is possible to detect the malfunction and/or anomaly and take the proper security measures. In addition, if only one of the apparatuses 1a,1b detects the malfunction and/or anomaly, only one valid message (in the worst case) could be produced (and possibly an invalid one), thus requiring that the recipient performs the task of discard the information contained in the body message. This operation is normally accomplished by the railway signalling apparatuses, which are usually configured to consider a message body valid only if each of the replicas sends said message body within a valid message.

There are obviously many possible variants to the example described above.

A first variant can use a different algorithm to calculate the pseudo-signature hash, such as Secure Hash (SHA) in one of its multiple variants or another algorithm.

The present description has tackled some of the possible variants, but it will be apparent to the man skilled in the art that other embodiments may also be implemented, wherein some elements may be replaced with other technically equivalent elements. The present invention is not therefore limited to the explanatory examples described herein, but may be subject to many modifications, improvements or replacements of equivalent parts and elements without departing from the basic inventive idea, as set out in the following claims.

The invention claimed is:

1. An apparatus for generating and exchanging messages for controlling a railway network, comprising:
   storage means that contain at least a first encryption key,
   communication means adapted for communicating with a second apparatus,
   one or more processors in communication with said storage means and said communication means, where said one or more processors are configured to:
      generate a first message body comprising information that can change the status of said railway network,
      generate a first pseudo-signature based on the first message body and the first encryption key,
      transmit, through the communication means, said first pseudo-signature to the second apparatus,
      receive, by means of the communication means, a second pseudo-signature from said second apparatus, where said second pseudo-signature is generated by said second apparatus based on a second message body and a second encryption key different from said first encryption key,
      generate a signature based on the second pseudo-signature and the first encryption key,
      generate a message by combining together the first message body and the signature, and
      transmit, through the communication means, said message to a recipient.

2. The apparatus according to claim 1, wherein the one or more processors are configured to:
   compute a summary of the first message body by running a set of instructions that implement a hashing algorithm, and
   generate the first pseudo-signature based on said summary and on said first encryption key.

3. The apparatus according to claim 2, wherein the one or more processors are configured to generate the first pseudo-signature by carrying out an exclusive bitwise OR operation between said summary and said first encryption key.

4. The apparatus according to claim 3, wherein the storage means further contain a verification key having a value equal to the result of an exclusive bitwise OR operation between the first and the second encryption key, and where the one or more processors are also configured to:
   carry out an exclusive bitwise OR operation between the first pseudo-signature and the second pseudo-signature,
   compare the verification key and the result of said exclusive bitwise OR operation with each other, and
   generate the signature only if the result of said exclusive bitwise OR operation is equal to the verification key.

5. The apparatus according to claim 4, wherein the one or more processors are configured to go into an error state (ERR) in case the result of the exclusive bitwise OR operation between the first pseudo-signature and the second pseudo-signature is different from the verification key.

6. The apparatus according to claim 2, wherein computing the summary of the first message body is carried out by running a set of instructions that implement the MD4 algorithm.

7. The apparatus according to claim 1, wherein the one or more processors are configured to alter the first pseudo-signature or the signature in case said apparatus detects a malfunctioning and/or the occurrence of an abnormal condition, so as to invalidate said message.

8. The apparatus according to claim 1, wherein the one or more processors are further configured to:
   send, by means of the communication means, the generated message to the second apparatus,
   receive, by means of the communication means, a second message from said second apparatus,
   compare the generated message with the second message, and
   transmit, through the communication means, said message to the recipient only if the two messages are equal to each other.

9. A system for generating messages for controlling a railway network, comprising:
   a first apparatus according to claim 1, and
   a second apparatus according to claim 1, where said first and second apparatuses implementing the exchange of the pseudo-signatures generated by each of them therebetween.

10. A method for generating and exchanging messages for controlling a railway network, comprising:
   a. generating a first message body, by one or more processors, said first message body comprising information that can change a status of said railway network,
   b. generating, by said one or more processors, a first pseudo-signature based on the first message body and on a first encryption key,
   c. transmitting, by communication means, said first pseudo-signature is transmitted to an apparatus and receiving, by said communication means, a second pseudo-signature from said apparatus, where said second pseudo-signature is generated by said apparatus based on a second message body and on a second encryption key different from the first encryption key,
   d. generating, by said one or more processors, a signature based on the second pseudo-signature and on the first encryption key,
   e. generating, by said one or more processors, a message by combining together the first message body and the signature,
   f. transmitting said message to a recipient by the communication means.

11. A computer program product comprising a non-transitory storage device, stored thereon computer-executable instructions, when the computer-executable instructions are loaded in a memory of a computer and executed by one or more processors of the computer, the one or more processors are configured to:
   generate a first message body that comprises information that can change a status of a railway network;
   generate a first pseudo-signature based on the first message body and a first encryption key;
   transmit said first pseudo-signature to an apparatus;
   receiving a second pseudo-signature from said apparatus, wherein said second pseudo-signature is generated by said apparatus based on a second message body and a second encryption key different from the first encryption key;
   generate a signature based on the second pseudo-signature and on the first encryption key;
   generate a message by combining together the first message body and said signature; and
   transmit said message to a recipient.

* * * * *